(12) United States Patent
Adamson et al.

(10) Patent No.: US 7,927,199 B2
(45) Date of Patent: Apr. 19, 2011

(54) GRAIN CLEANING ASSEMBLY SUPPORT FRAME MOVABLE IN TWO PLANES

(75) Inventors: James K. Adamson, Colona, IL (US); Wesley Brands, Colona, IL (US); Francisco Mezzomo, Santa Maria (BR)

(73) Assignee: Deere & Company, Moline, IL (US)

( * ) Notice: Subject to any disclaimer, the term of this patent is extended or adjusted under 35 U.S.C. 154(b) by 22 days.

(21) Appl. No.: 12/173,942

(22) Filed: Jul. 16, 2008

(65) Prior Publication Data

US 2010/0016044 A1    Jan. 21, 2010

(51) Int. Cl.
*A01F 12/32* (2006.01)
*B07B 1/00* (2006.01)

(52) U.S. Cl. ........................................ 460/101

(58) Field of Classification Search .................. 460/101, 460/92, 93, 9, 91, 102; 209/233, 416, 261
See application file for complete search history.

(56) References Cited

U.S. PATENT DOCUMENTS

| | | | | |
|---|---|---|---|---|
| 2,500,448 A * | 3/1950 | Bozarth | ................. | 209/416 |
| 2,893,558 A * | 7/1959 | Zollinger | ................. | 209/254 |
| 3,186,548 A * | 6/1965 | Stroburg et al. | ............... | 209/416 |
| 4,344,443 A * | 8/1982 | De Busscher et al. | .......... | 460/97 |
| 4,535,788 A * | 8/1985 | Rowland-Hill et al. | .......... | 460/9 |
| 4,548,214 A * | 10/1985 | Sheehan et al. | ................. | 460/9 |
| 4,557,276 A * | 12/1985 | Hyman et al. | ................. | 460/9 |
| 4,598,718 A * | 7/1986 | Glaubitz et al. | ................. | 460/9 |
| 4,736,753 A * | 4/1988 | Glaubitz et al. | ................. | 460/9 |
| 4,897,071 A * | 1/1990 | Desnijder et al. | ............... | 460/10 |
| 5,205,786 A * | 4/1993 | Murphy | ........................ | 460/9 |
| 6,579,172 B2 * | 6/2003 | Lauer | ............................ | 460/101 |
| 6,672,957 B2 * | 1/2004 | Voss et al. | ..................... | 460/101 |
| 6,843,719 B1 * | 1/2005 | Sacquitne | ..................... | 460/101 |
| 7,322,882 B2 * | 1/2008 | Duquesne et al. | ............ | 460/101 |
| 2006/0229119 A1 * | 10/2006 | Wamhof et al. | .............. | 460/101 |
| 2007/0123326 A1 * | 5/2007 | MacKin et al. | ............... | 460/101 |

* cited by examiner

*Primary Examiner* — Árpád Fábián-Kovács
(74) *Attorney, Agent, or Firm* — Taylor IP (57) ABSTRACT

A harvesting machine including a chassis and a cleaning shoe. The cleaning shoe is supported by the chassis. The cleaning shoe includes a frame and at least one grain cleaning element. The frame is moveable in a first plane relative to the chassis. The at least one grain cleaning element is supported by the frame. The at least one grain cleaning element is movable in a second plane different from the first plane.

20 Claims, 8 Drawing Sheets

GRAIN CLEANING ASSEMBLY SUPPORT FRAME MOVABLE IN TWO PLANES

FIELD OF THE INVENTION

The present invention relates to a grain cleaning assembly in a vehicle, and more particularly, to a grain cleaning assembly associated with a harvesting vehicle having a three-dimensional shake characteristic.

BACKGROUND OF THE INVENTION

The grain-harvesting combine includes a header, which cuts the crop and feeds it into a threshing rotor. The threshing rotor rotates within a perforated housing, performing a threshing operation of the grain from the crop directed thereinto. Once the grain is threshed it falls through perforations in the housing onto a grain pan. From the grain pan the grain falls through a set of upper and lower sieves that are known as the cleaning shoe. The sieves vibrate and/or oscillate causing clean grain to fall through for the collection of the grain and the removal of the chaff or other debris. The cleaning fan blows air through the sieves to discharge chaff toward the rear of the combine. Crop residue such as straw from the threshing section proceeds through a straw chopper and out the rear of the combine.

Combine harvesters that do not have a side slope compensation feature experience increased grain loss when operating on an incline. Gravity causes the grain to shift resulting in excessive loading on the downhill side of the cleaning shoe, which results in increased losses and a lower overall machine capability and capacity. There are several different types of side hill leveling systems that include various levels of performance, complexity and cost. Systems exist that level the entire machine, level the entire cleaning system within the combine or level the individual cleaning elements. There are also systems that induce side motion into the dynamics of the cleaning system to prevent the excessive loading on the downhill side of the machine. Existing three-dimensional shake systems either have limited performance capability or are complex.

What is needed in the art is a cost effective, economical to operate, three-dimensional shake system.

SUMMARY OF THE INVENTION

The present invention provides a cost effective efficient way to control and implement a three-dimensional shake system in a cleaning shoe.

The invention in one form is directed to a harvesting machine having a chassis and a cleaning shoe. The cleaning shoe is supported by the chassis. The cleaning shoe includes a frame and at least one grain cleaning element. The frame is moveable in a first plane relative to the chassis. The at least one grain cleaning element is supported by the frame. The at least one grain cleaning element is movable in a second plane different from the first plane.

DETAILED DESCRIPTION OF THE INVENTION

Figure 1:
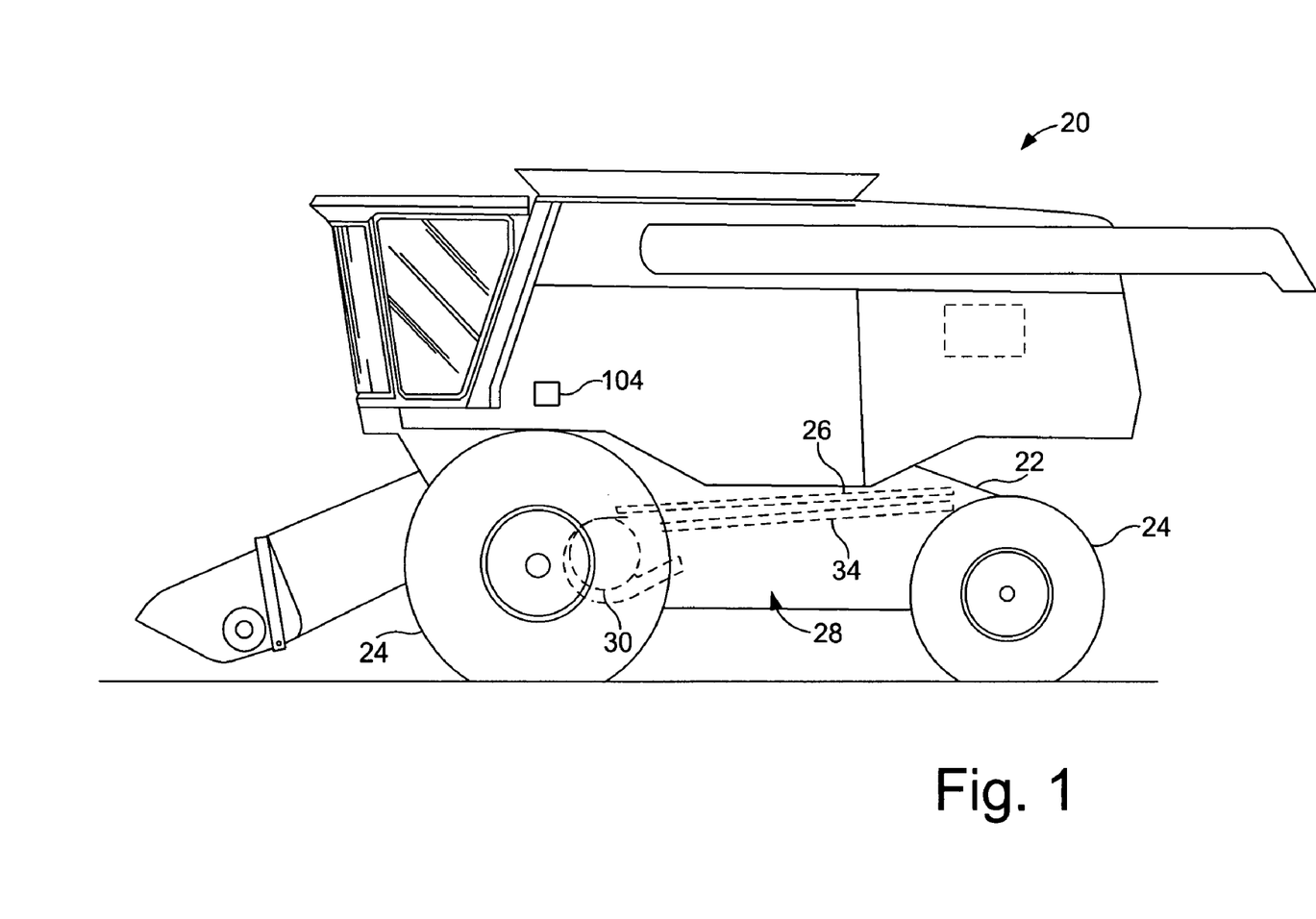
FIG. 1 is an illustrative vehicle utilizing an embodiment of the grain cleaning assembly of the present invention.

Referring now to the drawings, and more particularly to FIG. 1, there is shown a harvesting machine 20 having a chassis 22 supported by wheels 24. Grain that has been threshed encounters a sieve 26 with the grain falling into cleaning shoe assembly 28 for further processing. A fan 30 blows air into cleaning shoe assembly 28.

Figure 2:
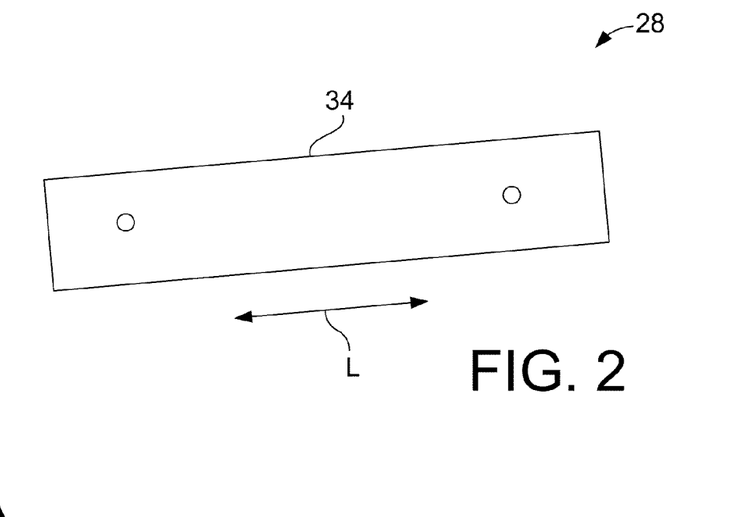
FIG. 2 is a side view of a cleaning shoe of the grain cleaning assembly and outer frame of the cleaning shoe moves in the plane of the view shown.
Figure 3:
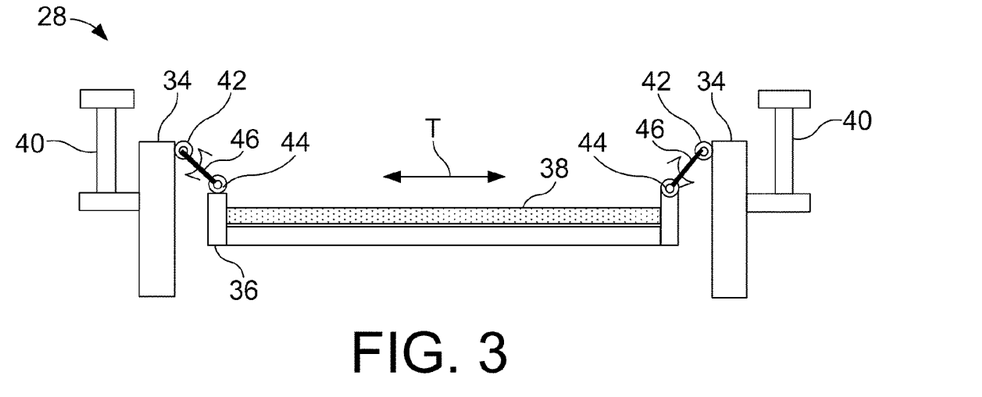
FIG. 3 is a schematical view of the cleaning assembly of FIGS. 1 and 2 shown in a plane orthogonal to that shown in FIG. 2.

Now, additionally referring to FIGS. 2 and 3, cleaning shoe assembly 28 includes an outer frame 34, an inner frame 36, a grain cleaning element 38 and swing arms 40. Swing arms 40 cause outer frame 34 to move in the plane of FIG. 2 with longitudinal direction L lying in the plane. Swing arms 40 cause outer frame 34 to move in a quasi-linear fashion or in a rocking motion in the plane of FIG. 2. The plane of FIG. 3 is substantially orthogonal to that of FIG. 2 with swing arms 40 pivoting about the circles of FIG. 2, which are illustrative of where swing arms 40 interconnect with outer frame 34. Inner frame 36 includes a grain cleaning element 38 with grain moving thereon. Attachment points 42 on outer frame 34 and attachment points 44 on inner frame 36 are interconnected by connecting members 46, which may be a hinging element, a resilient element and/or a flexible element allowing inner frame 36 to move in the plane of FIG. 3 illustrated by transverse direction T. Transverse direction T is substantially orthogonal to longitudinal direction L. Inner frame 36 has a freedom of movement orthogonal to the movement of frame 34. While the movement of frame 34 impacts a movement of frame 36 in the plane of FIG. 2, frame 34 does not undergo the movement in direction T allowing inner frame 36 to impart another direction of movement on the grain as it is moving across grain cleaning element 38.

Figure 4:
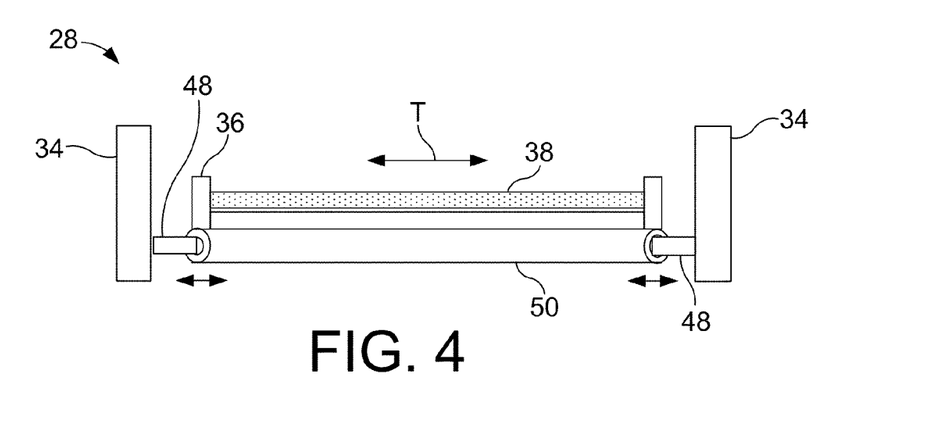
FIG. 4 is another embodiment of the grain cleaning assembly of FIGS. 1 and 2.

Now, additionally referring to FIG. 4, there is additionally illustrated a support member 48 connected to frame 36 with an interactive member 50 moving along support member 48. Interacting member 50 allows frame 36 to slide sideways in direction T. Interactive member 50 may be a sliding mechanism, a track mechanism and/or a telescoping mechanism allowing side-to-side movement of interactive member 50 as well as inner frame 36 attached thereto.

Figure 5:
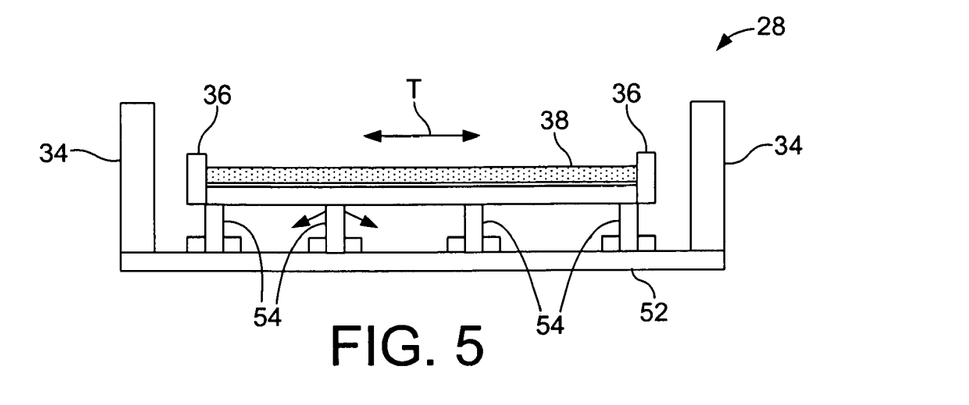
FIG. 5 is another embodiment of the grain cleaning assembly of FIGS. 1 and 2.

Now, additionally referring to FIG. 5, there is shown a support 52, connected to outer frame 34, having flexible vertical supports 54 connected between support 52 and inner frame 36. Flexible vertical supports 54 allow side-to-side motion of frame 36 relative to support 52. Support 52 is connected at each end to outer frame 34. Again flexible vertical supports 54 allow inner frame 36 to move side to side with slight up and down movement as flexible vertical supports 54 bend side to side.

Figure 6:
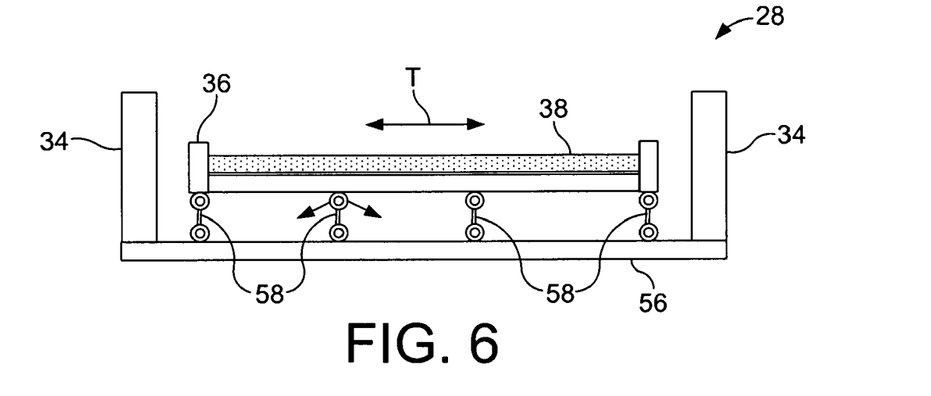
FIG. 6 is another embodiment of the grain cleaning assembly of FIGS. 1 and 2.

Now, additionally referring to FIG. 6, there is shown a support 56 substantially similar to the support 52 with flexible hinging members 58 connecting frame 36 to support 56. Frame 36 moves in a quasi-transverse direction T while hinging members 58 allow side-to-side movement relative to frame 34.

Figure 7:
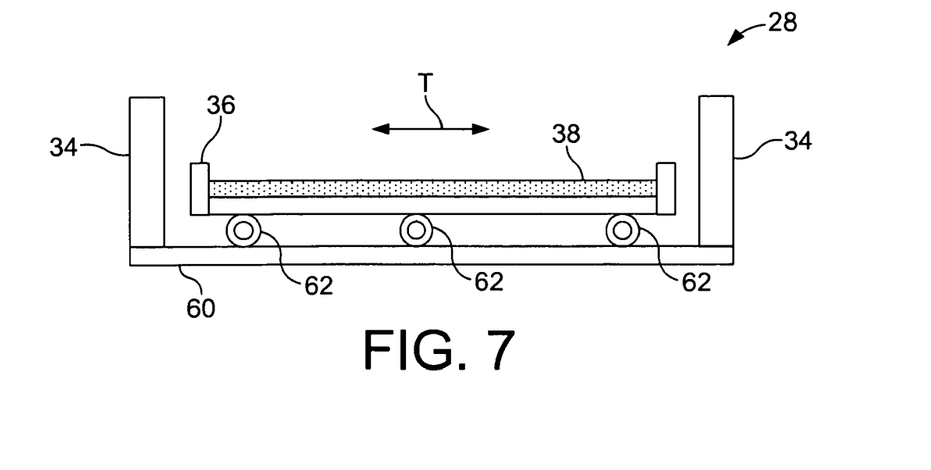
FIG. 7 is another embodiment of the grain cleaning assembly of FIGS. 1 and 2.

Now, additionally referring to FIG. 7, there is shown a support 60 with bearing members 62 supporting frame 36 allowing motion in transverse direction T while frame 34 moves in longitudinal direction L. While bearing members 62 are shown in schematical form frame members 62 can retain frame 36 to support 60.

Figure 8:
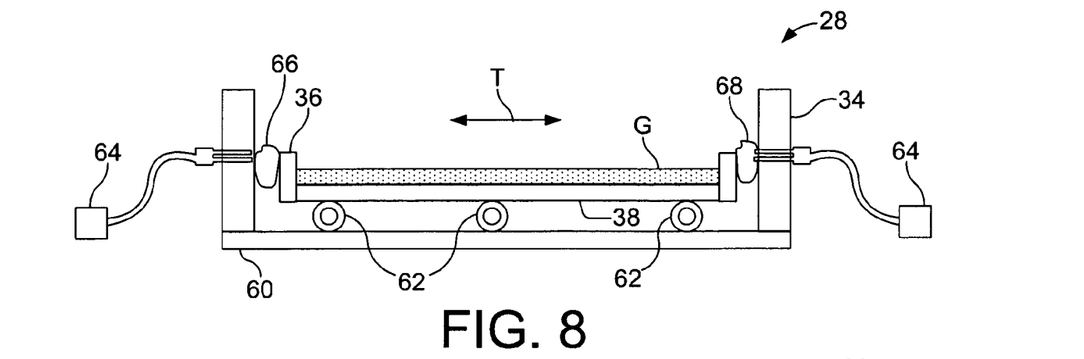
FIG. 8 is a schematical view of the embodiment of FIG. 7 illustrating one embodiment of moving the inner frame of the cleaning shoe of FIGS. 1-7.

Now, additionally referring to FIGS. 8-14, there are shown various embodiments of ways to control the movement of inner frame 36 relative to outer frame 34. While any of the foregoing methods of allowing a movement of frame 36 relative to outer frame 34 can be utilized, for the ease of understanding bearing members 62 utilized in FIG. 7 are used to illustrate the movement of inner frame 36 relative to outer frame 34 in FIGS. 8-10. In FIG. 8 there is shown controllable air sources 64 to provide controllable amounts of air, to air chambers 66 and 68, which alternately inflate and deflate causing inner frame 36 to move side-to-side in direction T.

Figure 9:
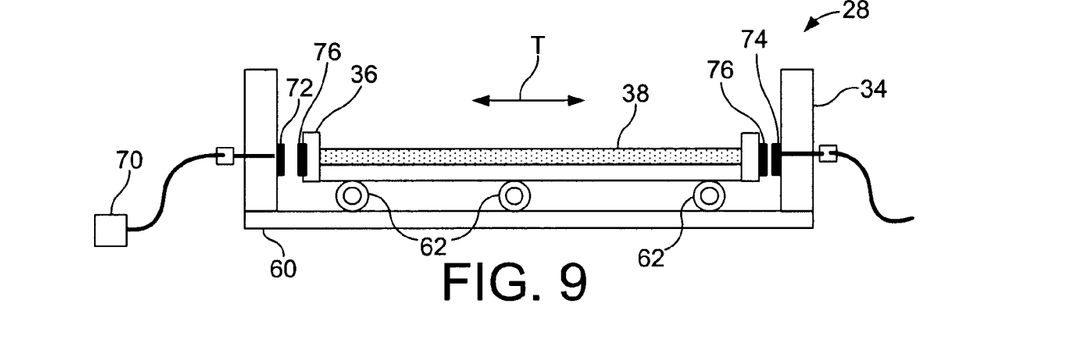
FIG. 9 is a schematical view of the embodiment of FIG. 7 illustrating another embodiment of moving the inner frame of the cleaning shoe of FIGS. 1-7.

In FIG. 9 there is shown an electromagnetic system for the moving of inner frame 36 where a controller 70 controls the operation of electromagnets 72 and 74 as they alternately attract and/or repel magnetic devices 76. Magnetic devices 76 may be of ferrous metal that is attracted to electromagnetic 74 or may be a magnet 76 may be alternately attracted to, or repelled from, an electromagnet 72 or 74 under the control of controller 70.

Figure 10:
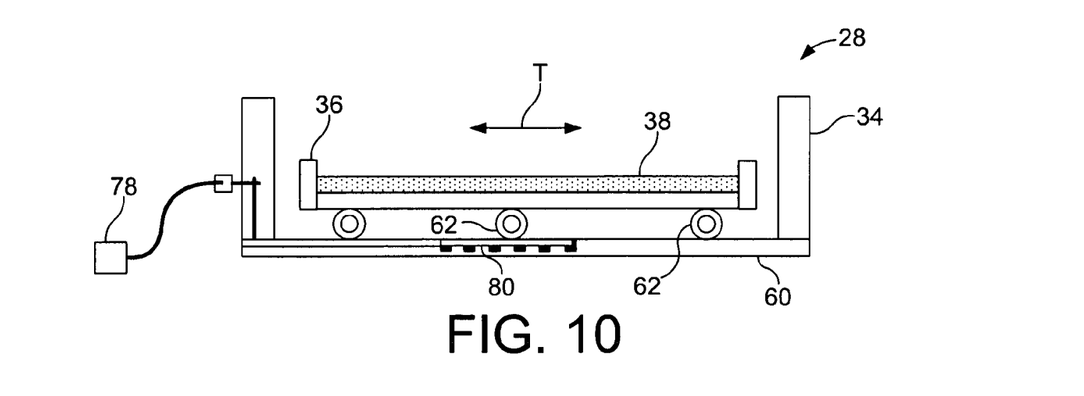
FIG. 10 is a schematical view of the embodiment of FIG. 7 illustrating another embodiment of moving the inner frame of the cleaning shoe of FIGS. 1-7.

In FIG. 10 there is shown a controller 78 that interacts with electromagnetic system 80 some of which may be in the form of a linear motor causing movement of inner frame 36 in direction T relative to frame 34. Controllers 64, 70 or 78 provide for the controllability of the movements of inner frame 36 relative to outer frame 34. For example, the movements of inner frame 36 can be used to compensate for imprecise loading of grain upon grain cleaning element 38. An imbalance of grain loading, which may be caused by the attitude of combine 20, can be compensated for by the present invention by using a selected movement profile for inner frame 36 based upon the attitude or other detected elements such as the positioning of the grain on element 38 or a detected weight distribution across element 38.

Figure 11:
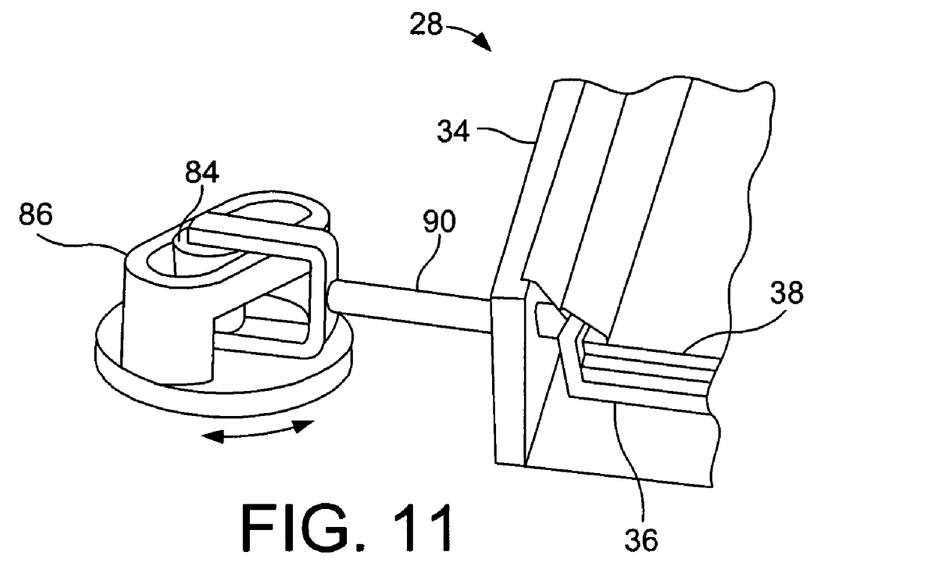
FIG. 11 is an illustration of another embodiment of an apparatus for the moving of the inner frame of the cleaning shoe of FIGS. 1-7.
Figure 12:
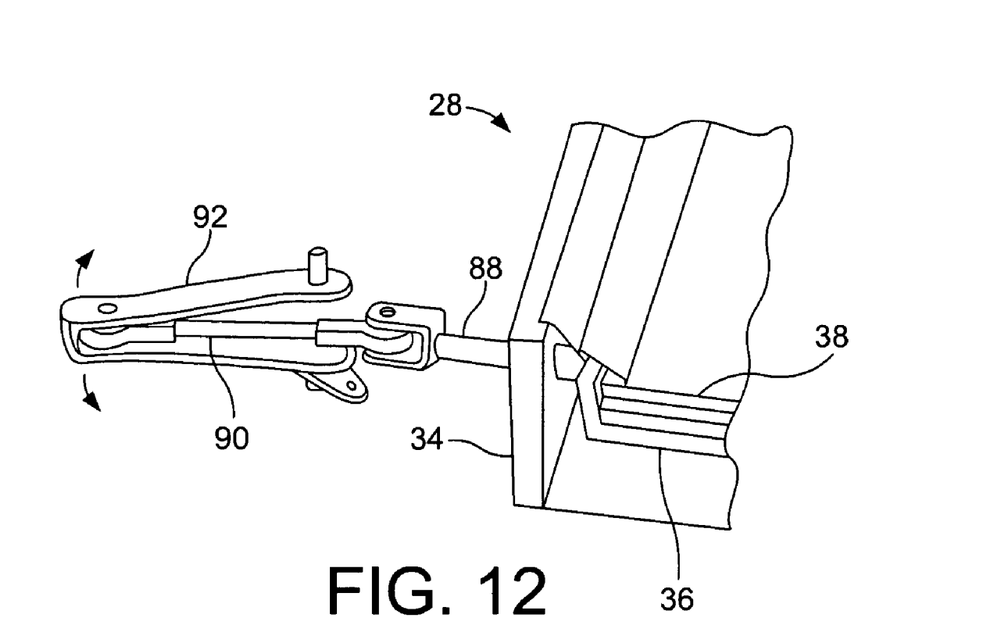
FIG. 12 is an illustration of another embodiment of an apparatus for the moving of the inner frame of the cleaning shoe of FIGS. 1-7.
Figure 13:
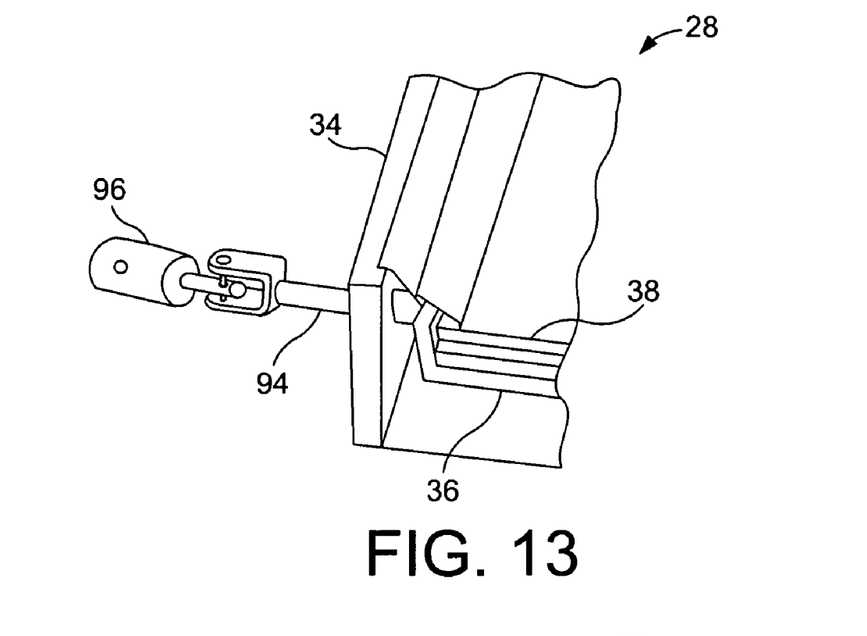
FIG. 13 is an illustration of another embodiment of an apparatus for the moving of the inner frame of the cleaning shoe of FIGS. 1-7.
Figure 14:
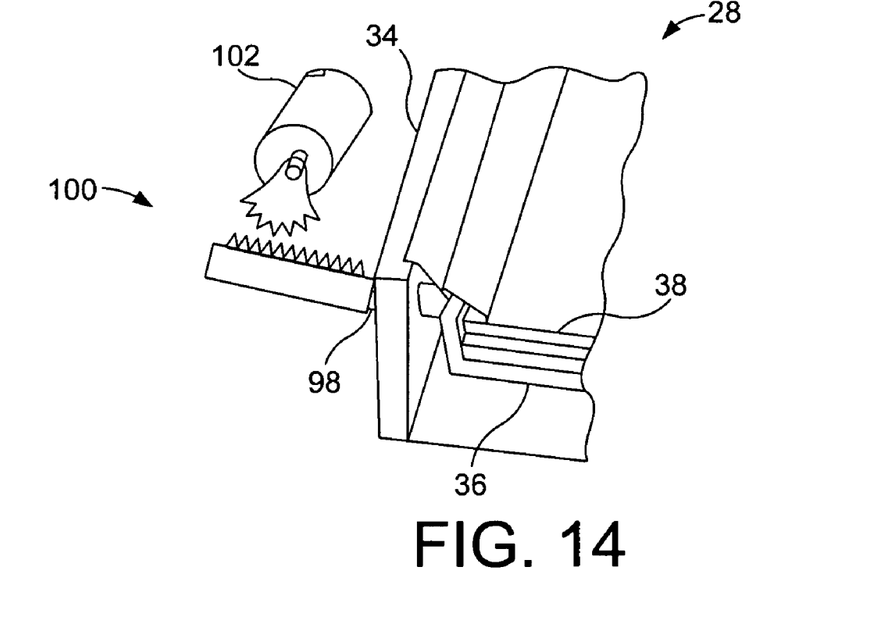
FIG. 14 is an illustration of another embodiment of an apparatus for the moving of the inner frame of the cleaning shoe of FIGS. 1-7.

Additional ways of controlling the positioning and movement of inner frame 36 relative to outer frame 34 are illustrated in FIGS. 11-14. While examples are shown relative to one corner, it is understood that these devices may exist on each side of outer frame 34 and even at multiple locations along frame 34. FIGS. 13 and 14 illustrate further active devices including a linkage 94 going through a sidewall of outer frame 34 and connecting to inner frame 36. Actuator 96, which maybe hydraulic, electrical or pneumatic having a piston driving a shaft interconnected with linkage 94 under the control of a controller that again determines the position of inner frame 36 relative to outer frame 34 as they move in orthogonal directions. In a like manner linkage 98 is connected to interacting actuator 100 which may be a gear, a cam or a crank that is driven in a controllable manner by a motor 102 causing inner frame 36 to move in a direction orthogonal to the movement of outer frame 34, relative to outer frame 34.

FIGS. 11 and 12 illustrate passive yet adjustable methods of moving inner frame 36. In FIG. 11 there is shown a linkage 82 that connects inner frame 36 in a stirrup arrangement having a roller 84 that follows a track 86 to thereby cause inner frame 36 to move in a side to side manner as frame 34 moves in a substantially orthogonal manner. Track 86 can be rotatable, as shown in FIG. 11 and under the control of a controller or by way of a manual setting, to affect the amount of side-to-side movement of inner frame 36. Track 86 may be under the control of an active controller causing track 86 to be rotated to cause differing movement of inner frame 36 as track 86 is adjusted.

In FIG. 12 a linkage 88 is illustrated as being attached to frame 36 providing defined side-to-side movement of frame 36 within frame 34. Pivoting linkage 90 connects linkage 88 with adjusting linkage 92. Adjusting linkage 92 may be positioned at a selected angle and may be adjusted in a similar fashion to track 86 of FIG. 11. Adjusting linkage 92 may be rotated to thereby cause a difference in the positioning of inner frame 36 relative to outer frame 34 as outer frame 34 travels in a substantially routine motion normal to the movement of inner frame 36.

Figure 15:
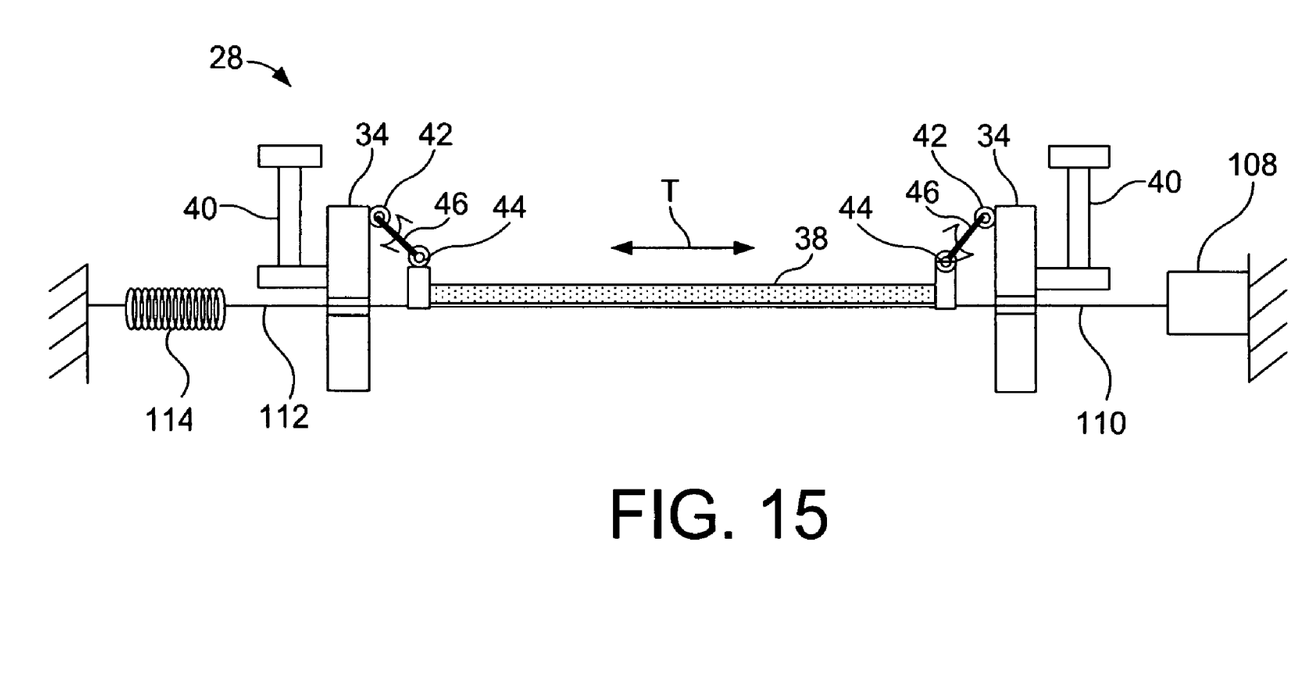
FIG. 15 is a schematical view of another embodiment of the cleaning assembly of FIGS. 1 and 2 shown in a plane orthogonal to that shown in FIG. 2.

Now, additionally referring to FIG. 15, there is illustrated another embodiment of the present invention, which has many similar elements to FIG. 3. Different than the previous embodiments grain cleaning element 38 is directly connected to the double hinge arrangement 42, 44, 46. Cables 110 and 112 are coupled to grain cleaning element 38 through openings in frame 34. While the fore/aft movement of frame 34 will cause movement of grain cleaning element 38 if cable 110 is constrained and spring 114 allows the movement of cable 112 through frame 34, it is also contemplated to use an actuator 108 to controllably pull cable 110. Spring 114 keeps tension on cables 110 and 112 to thereby position grain cleaning element 38 as cable 110 is pulled and relaxed. The combination of the fore/aft movement of frame 34 and the actions of actuator 108 coact to move grain cleaning element 38 in a manner that positions and moves the grain on grain cleaning element 38.

Figure 16:
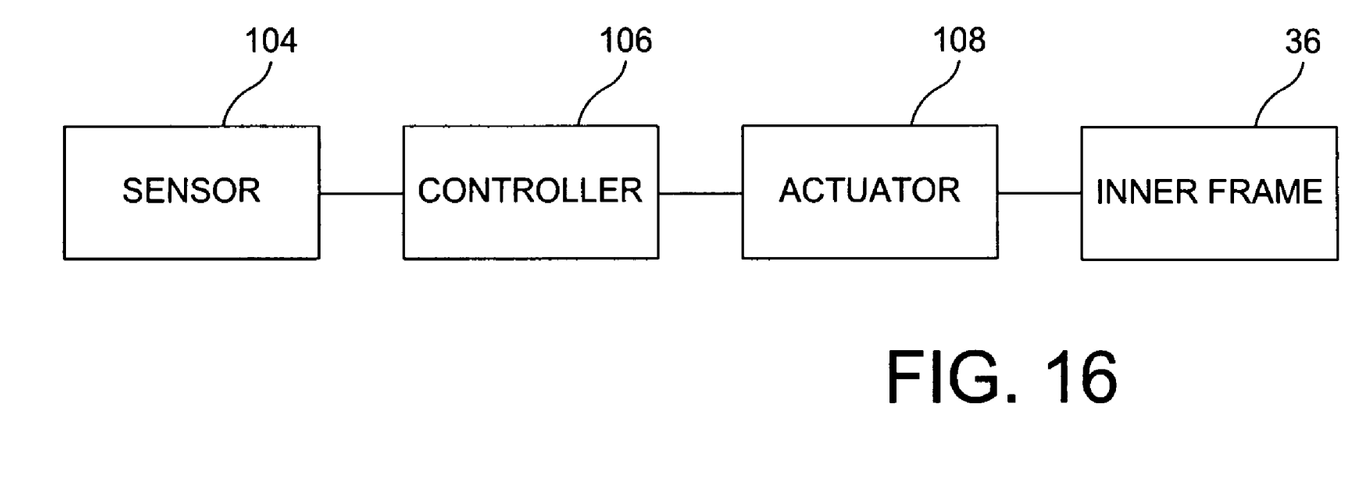
FIG. 16 is a schematical representation of controller utilizing one of the actuators illustrated in the previous figure.

Now, additionally referring to FIG. 16, there is illustrated a control system in which a sensor 104, which may be an attitude sensor to determine the attitude of the operation of combine 20 allowing controller 106, which is a representative of any of the controllers previously mentioned, to provide control signals to actuator 108, which may be any of the actuators in the actuator mechanisms previously discussed that are attached to inner frame 36. Inner frame 36 may be positioned and moved dependent upon the information from sensor 104 to cause the grain on grain cleaning element 38 to be more evenly distributed across grain cleaning element 38 even though combine 20 may be in an unfavorable attitude for the efficient cleaning of grain.

This can be considered a side slope compensating cleaning shoe assembly 28 having a high performance capability yet a simple drive and low side forces. The present invention can be easily modified to a current level-land cleaning system adding the internal secondary frame to mount the cleaning elements to. Inner frame 36 is attached to outer frame 34 with a mechanism that allows for side-to-side motion relative to outer frame 34 in a hinged suspension, sliding or rolling manner. External mechanisms illustrated may be attached directly to inner frame 36 to control the amount and direction of side motion imparted to inner frame 36, which may be related to the position and velocity of outer frame 34. Outer frame 34 moves in the plane that includes longitudinal direction L but the motion of grain cleaning element 38 is a side-to-side motion relative to outer frame 34. In acting together the motion imparted to grain cleaning element 38 may be a diagonal motion or some other motion that is controllably imparted to the grain moving across grain cleaning element 38. The present invention advantageously avoids complex diagonal motion equipment of the mainframe only requiring the movement of the smaller inner frame 36 and the elements that move it side-to-side. This creates lower side forces than moving the entire shoe or shoe frame side-to-side.

For the ease of understanding inner frame 36 has been described above as supporting grain cleaning element 38 and that movement in direction T is imparted to inner frame 36 and hence to grain cleaning element 38. However, it can also be understood that outer frame 34 can support grain cleaning element 38 in a movable manner and that the movement of grain cleaning element 38 may be induced by being directly coupled to the movement inducing devices described herein, without the use of inner frame 36. Further, any of the motion inducing devices described above can be used with any device that suspends/supports grain cleaning element 38 to implement the present invention.

Having described the preferred embodiment, it will become apparent that various modifications can be made without departing from the scope of the invention as defined in the accompanying claims.

The invention claimed is:

1. A harvesting machine, comprising:
    a chassis;
    a cleaning shoe supported by said chassis, said cleaning shoe including:
        a frame configured for movement relative to said chassis in a first direction in a first plane; and
        at least one grain cleaning element movably coupled to said frame, said at least one grain cleaning element configured for a side-to-side movement relative to said frame in a second direction in a second plane different from said first plane thereby defining a three dimensional grain shaking system in said cleaning shoe, said first direction and said second direction having an angle therebetween.

2. The harvesting machine of claim 1, wherein said first direction is substantially orthogonal to said second direction.

3. The harvesting machine of claim 1, wherein said cleaning shoe further includes at least one hinge mechanism coupling said at least one grain cleaning element to said frame.

4. The harvesting machine of claim 3, wherein said at least one hinge mechanism is configured to suspend said at least one grain cleaning element from said frame.

5. The harvesting machine of claim 3, wherein said at least one hinge mechanism supports said at least one grain cleaning element above a portion of said frame.

6. The harvesting machine of claim 1, wherein said cleaning shoe further includes one of at least one flexible member, at least one roller, at least one bearing, at least one sliding mechanism and at least one telescoping device supporting said at least one grain cleaning element from said frame.

7. The harvesting machine of claim 1, wherein said cleaning shoe further includes at least one movement inducing device coupled to said at least one grain cleaning element, said movement inducing device being configured to move said at least one grain cleaning element in said second plane.

8. The harvesting machine of claim 7, wherein said at least one movement inducing device is additionally coupled to said chassis, said at least one movement inducing device not being coupled to said frame.

9. The harvesting machine of claim 7, wherein said at least one movement inducing device translates movement of said frame into movement of said at least one grain cleaning element.

10. The harvesting machine of claim 7, wherein said at least one movement inducing device includes at least one of a hydraulic actuator, an electric actuator, a pneumatic actuator, an electric motor, an air chamber, an air bladder and an electromagnet.

11. The harvesting machine of claim 7, further comprising an attitude sensor configured to sense an attitude of said chassis, said at least one movement inducing device altering movement of said at least one grain cleaning element dependent upon said attitude sensed by said attitude sensor.

12. A cleaning shoe for use by a harvester machine, the cleaning shoe comprising:
    a frame configured for movement relative to the harvester machine in a first direction in a first plane; and
    at least one grain cleaning element supported by said frame, said at least one grain cleaning element configured for a side-to-side movement relative to said frame in a second direction in a second plane different from said first plane thereby defining a three-dimensional shake system in the cleaning shoe, said first direction and said second direction having an angle therebetween.

13. The cleaning shoe of claim 12, wherein said first plane is substantially orthogonal to said second plane.

14. The cleaning shoe of claim 12, further comprising at least one hinge mechanism coupling said at least one grain cleaning element to said frame.

15. The cleaning shoe of claim 14, wherein said at least one hinge mechanism is configured to suspend said at least one grain cleaning element from said frame.

16. The cleaning shoe of claim 14, wherein said at least one hinge mechanism supports said at least one grain cleaning element above a portion of said frame.

17. The cleaning shoe of claim 12, further comprising one of at least one flexible member, at least one roller, at least one bearing, at least one sliding mechanism and at least one telescoping device supporting said at least one grain cleaning element from said frame.

18. The cleaning shoe of claim 12, further comprising at least one movement inducing device coupled to said at least one grain cleaning element, said movement inducing device being configured to move said at least one grain cleaning element in said second plane.

19. The cleaning shoe of claim 18, wherein said at least one movement inducing device is additionally coupled to said chassis, said at least one movement inducing device not coupled to said frame.

20. The cleaning shoe of claim 18, wherein said at least one movement inducing device translates movement of said frame into movement of said at least one grain cleaning element.

* * * * *

UNITED STATES PATENT AND TRADEMARK OFFICE
CERTIFICATE OF CORRECTION

| | | |
|---|---|---|
| PATENT NO. | : 7,927,199 B2 | Page 1 of 1 |
| APPLICATION NO. | : 12/173942 | |
| DATED | : April 19, 2011 | |
| INVENTOR(S) | : James K. Adamson et al. | |

It is certified that error appears in the above-identified patent and that said Letters Patent is hereby corrected as shown below:

COVER PAGE, item [54] and Col. 1
Delete the title "GRAIN CLEANING ASSEMBLY SUPPORT FRAME MOVABLE IN TWO PLANES", and substitute therefore --GRAIN CLEANING ASSEMBLY--.

Signed and Sealed this
First Day of May, 2012

David J. Kappos
*Director of the United States Patent and Trademark Office*